US008027921B1

(12) United States Patent
Boydstun et al.

(10) Patent No.: US 8,027,921 B1
(45) Date of Patent: Sep. 27, 2011

(54) METHOD AND SOFTWARE FOR MIGRATING PROTECTED AUTHENTICATION DATA

(75) Inventors: Kenneth Charles Boydstun, Carrollton, TX (US); Bharath Kuruvalli, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1486 days.

(21) Appl. No.: 10/075,336

(22) Filed: Feb. 13, 2002

(51) Int. Cl.
*G06F 21/00* (2006.01)
*G06Q 20/00* (2006.01)
(52) U.S. Cl. ........... 705/50; 705/51; 705/52; 705/53; 705/54; 705/55; 705/56; 705/57; 705/58; 705/59; 705/67
(58) Field of Classification Search ............ 705/51–67
See application file for complete search history.

(56) References Cited

U.S. PATENT DOCUMENTS

| | | | | |
|---|---|---|---|---|
| 5,708,812 A | * | 1/1998 | Van Dyke et al. | 717/171 |
| 5,832,211 A | * | 11/1998 | Blakley et al. | 726/6 |
| 6,490,624 B1 | * | 12/2002 | Sampson et al. | 709/227 |
| 6,591,305 B2 | * | 7/2003 | Densmore | 709/245 |
| 6,609,115 B1 | * | 8/2003 | Mehring et al. | 705/51 |
| 6,609,131 B1 | * | 8/2003 | Zait et al. | 707/102 |
| 6,986,038 B1 | * | 1/2006 | Leah et al. | 713/155 |
| 7,016,953 B2 | * | 3/2006 | Lemon | 709/224 |

* cited by examiner

*Primary Examiner* — Calvin Loyd Hewitt, II
*Assistant Examiner* — Cristina Owen Sherr

(57) ABSTRACT

The present disclosure attempts to migrate from a first authenticator to a second authenticator. In the most preferred embodiment, the first step is to migrate the data that is not stored encrypted by a traditional replication or transformation between the datastores of the authenticators. The new authenticator is placed in position, while the old authenticator is maintained. When a user attempts to login, servlets check to see if the user's password exists within the datastore for the new authenticator. If not, then the user is sent to the old authenticator's sign-on page. When the user enters their authentication credentials into the old authenticator, a code snippet or second servlet will capture this information and, on confirmation from the old authenticator that the user is properly authenticated, use the captured information to populate the new datastore.

13 Claims, 2 Drawing Sheets

METHOD AND SOFTWARE FOR MIGRATING PROTECTED AUTHENTICATION DATA

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The field of the present invention includes authentication and authorization services. More particularly, embodiments of the present invention provide a method for migrating from one authentication and authorization service to another.

BACKGROUND OF THE INVENTION

A number of third-party vendors market software which provides authentication and authorization services. One example is a service that protects web-based resources. When a user enters a valid login ID and password, the authentication and authorization service retrieves the user's data from a database and displays a personalized HTML page. These authentication software packages (also referred to herein as "authenticators") store and organize the authentication information in various datastores (databases, directories, etc). In keeping with the secure nature of the information many of the vendors use proprietary schema and/or encryption to store such information. While this provides added security to that vendor's system, it also makes it more difficult to migrate to a new vendor's product without having to have every user re-enter their security information. It is preferable for migrations to be as transparent to the end user as reasonably possible.

While the use of a Relational Data Base Management System (RDBMS) (ORACLE for example) as a datastore is very common, in other areas of programming, alternative methods do exist to the use of relational databases as datastores. One alternative is the use of flat files. Another alternative is the use of directory services. One standardized method of implementing directory services, and data store interfaces to interact with directory services, is the use of the Lightweight Directory Access Protocol version 2, the specification of which is incorporated herein by reference in its entirety. Hereinafter, when discussing this specification, it may also be referred to as LDAP version 2. LDAP version 3 also may be used and its specification is also herein incorporated by reference. LDAP is used as a generic designation for interfaces and protocols compliant with a version of the Lightweight Directory Access Protocol. For purposes of this application, by definition any server or interface which is compliant with LDAP version 3 (or a later version of LDAP) would also be viewed as compliant with LDAP version 2. The converse is not necessarily correct.

In one example, a first authenticator providing web based authentication and authorization uses a proprietary database schema built on an RDBMS as the datastore for authority for user authentications and authorizations to web protected resources (such as html pages or java applets). The desired migration is to a second authenticator which uses a directory service, preferably an LDAP-compliant directory service, as its datastore. While most of the LDAP product vendors supply toolsets or utilities that will aid in the migration from Relational Data Base Management System (RDBMS) into LDAP frameworks, these only work if the RDBMS is generic in nature. Since the first authenticator is built using a proprietary database schema, it therefore does not provide a seamless use of these tools. Specifically, the first authenticator uses a proprietary table structure (schema) and also a proprietary encryption algorithm to store the data encrypted.

A desirable feature in a security migration is to port user data out of the proprietary and/or encrypted datastore of the old authenticator into the new datastore for the new authenticator while minimizing the impact on the user experience, thereby allowing transitioning from one authenticator to the next for the protection of web resources with minimal impact to applications or users.

SUMMARY OF THE INVENTION

A preferred embodiment of the present disclosure addresses a method for migrating from a source user authenticator to a target user authenticator. The users being authenticated may be persons, systems, networks, workstations, software objects, or applications. The source user authenticator has a source datastore containing encrypted password data and other unencrypted data. The data represents data for multiple users each having an identification and an associated password. Depending on the embodiment, the source datastore may be a relational database or may be another datastore known to those of skill in the art such as a flat file or a directory service. The target user authenticator has a target datastore, which, depending on the embodiment may be an LDAP compliant directory service, another form of directory service, a relational database or may be another datastore known to those of skill in the art.

In a preferred embodiment the method may include the action of reading selected unencrypted data from the source datastore. The unencrypted data could then be converted to be compatible with the target datastore. The target datastore could then be populated with the converted data.

After this point a preferred embodiment will receive an identification from a user seeking access to information protected by the target user authenticator. The corresponding identification in the target datastore is located and it is determined whether the target datastore includes a password associated with the identification. A password from the user associated with the received identification is also received. If the target datastore does not include a password associated with the identification, then the received identification and received password are submitted to the source user authenticator. The source user authenticator is then monitored for an approval response. On receipt of an approval response from the source user authenticator, the target datastore is populated with the received password associating the received password with the corresponding identification. Finally, the identification and password are authenticated using the target user authenticator.

In a preferred embodiment, if, after determining whether the target datastore includes a password associated with the identification, the target datastore does include a password associated with the identification, then the identification and password are authenticated using the target user authenticator. In one alternative embodiment, the action of receiving a password from a user includes receiving a password in a single submission from the user in conjunction with receiving the identification from the user. In a preferred alternative embodiment, the action of receiving a password from a user includes receiving a password in a submission from the user after the initial submission of the identification from the user. Various embodiments may also involve prompting for and receiving the password or both the identification and the password from the user after the initial submission of the identification from the user. Where both the identification and the password are prompted for, one embodiment uses the source authenticator to perform this action, while other embodiments may use the target authenticator or independent servlets. Further in the most preferred embodiment, while the source user authenticator is receiving the submitted password from the user, capturing the password provided by the user in response to the source authenticator prompting and using the captured password as the received password. Alternative embodiments could capture the password after the source authenticator has provided an approval response to the submitted password.

The present disclosure provides an alternative embodiment which represents a method for populating password data to a target datastore of a target user authenticator after migration from a source user authenticator having a source datastore, while also responding to user requests for information. In one embodiment of this method a request to the source user authenticator from a user seeking access to information protected by the target user authenticator is intercepted. The user is prompted for an identification. The identification is received from the user. The corresponding identification is located in the target datastore and it is determined whether the target datastore includes a password associated with the identification. If the target datastore does not include a password associated with the identification, then the original intercepted request is allowed to go through to the source user authenticator. The source user authenticator is used to prompt for and receive the identification and a password from the user. The source user authenticator is monitored for an approval response. In one embodiment the password provided by the user in response to the source authenticator prompting is captured and used as the received password during or after receipt of the password by the source authenticator. In a preferred alternative, after receipt of an approval response from the source user authenticator the password is captured and used as the received password. In either event, after receipt of an approval response from the source user authenticator, the target datastore is populated with the received password associating the received password with the corresponding identification. The identification and password are then authenticated using the target user using the target user authenticator.

DESCRIPTION OF THE DRAWINGS

The invention, together with further advantages thereof, may best be understood by reference to the following description taken in conjunction with the accompanying drawings in which.

DETAILED DESCRIPTION

Figure 1:
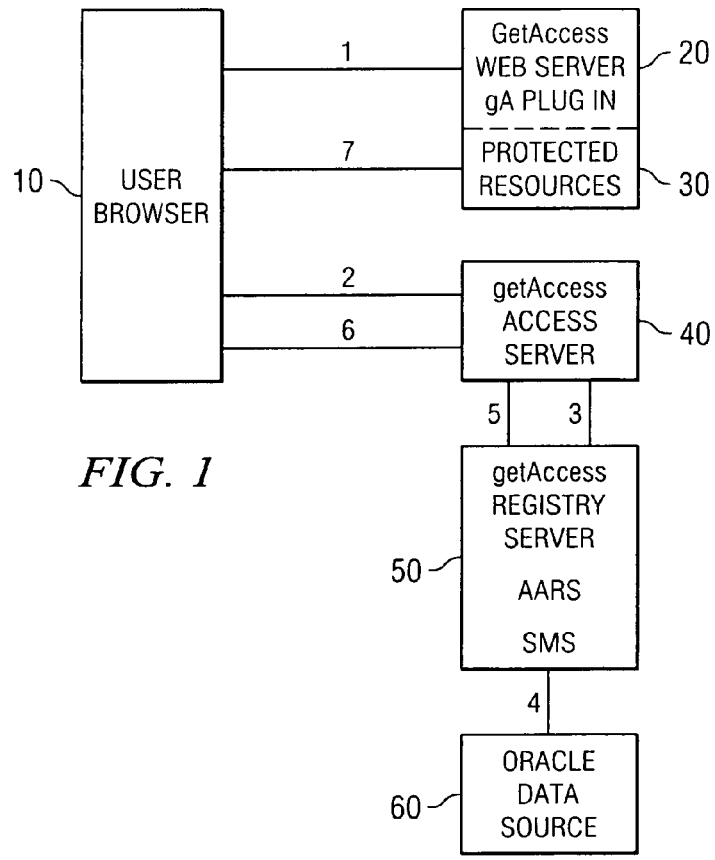
FIG. 1 is a structural diagram of an original process of authentication and authorization.

The present disclosure provides a method and software for migrating from a first authentication and authorization system to a second while minimizing the impact on end users and applications. While the specifics of the disclosure address a migration from an RDBMS datastore using encryption and proprietary schema to an LDAP compliant directory service as a datastore, one of skill in the art will recognize that the advantages provided by this disclosure would apply in almost any migration of authenticators where the security datastore of the old authenticator is protected (by its custom configuration, proprietary nature, or by encryption) to discourage or prevent simple replication or use of standard transformation tools on the datastore as a whole. Hence the present disclosure could also apply to a migration between any two authenticators regardless of the base format of their datastores (two different RDBMS systems, two different directory services, flat files, or any one of the above to another of the above).

Similarly, while the preferred embodiment of the following disclosure specifically addresses migration of a web-based authentication and authorization service, one of skill in the art will recognize that the teachings of this disclosure could also apply to any authentication and authorization service in which users exchange authentication information (such as identification information and a password or other confirming code or information) with the authenticator to initiate each session.

In the most preferred embodiment, the present disclosure attempts to migrate from a first authenticator to a second authenticator. The first authenticator is built using a proprietary table structure (schema) in an RDBMS and also a proprietary encryption algorithm to store the data encrypted. The second authenticator is built using an LDAP-compliant directory service as its datastore for authentication (or security) information. One of the most difficult aspects of migration of an authentication system is migration of the authentication information for the individual users (whether the users are persons or applications or other computers or networks). While one could always simply change out the authentication system and have every user re-register to provide new security information this involves substantial coordination including safeguards that the authorized user is the one providing the new information. It also causes significant additional effort by the end users, while a more transparent migration reduces end user frustration. Finally, in a simple world one could replicate or transform the security datastore to a datastore for the new system, porting the information across all at once and having it available for the new authenticator to use. However, as discussed above, the custom nature of some of the schema and the various encryption efforts make this task highly challenging to impossible for some migrations.

As discussed previously, most of the LDAP product vendors supply toolsets or utilities that will aid in the migration from Relational Data Base Management Systems (RDBMS) into LDAP frameworks. The known existing migration toolsets are meant to migrate large bulk static data from generic Oracle databases into LDAP datastores. These only work if the RDBMS is generic in nature and would not work to effect the desired migration.

As a result, applicant is not aware of any existing products to migrate user authentication and authorization information from a proprietary RDBMS database into an LDAP based datastore without major modification or outages. These modifications can cause a need for extensive application re-coding, interface changes, or even unusable data.

The current disclosure addresses a process for migrating between the two authenticators and specifically addresses migrating the authentication information from one datastore to the other as a part of the overall migration. In the most preferred embodiment, the first step is to migrate the data that is not stored encrypted first. This is done in a traditional replication or transformation between corresponding fields in the two datastores, (the source datastore and the target datastore). The main field that is of concern that is encrypted is the password. Since it is stored encrypted, it can not simply be copied into an LDAP datastore and be expected to work.

The preferred embodiment starts by placing the new authenticator in position, but keeps the old authenticator up and running to help process entries where needed. When a user attempts to login, the method uses servlets to first check to see if the user's password exists within the datastore for the new authenticator. If not, then the user is sent to the old authenticator's sign-on page. When the user enters their authentication credentials into the old authenticator, a second servlet will capture this information and wait to see if the user is properly authenticated (to make sure the credentials are correct). As a preferred alternative, where possible, a code snippet attached to the login process could accomplish the function of this second servlet. The capture may be made during entry of the authentication credentials into the old authenticator or may occur after confirmation of proper authentication. Regardless, once the user is confirmed by the old authenticator, the information captured will be used to populate the new datastore, and the user will be redirected (by HTTP) to the proper page they were requesting. The user may or may not be asked to reauthenticate by the new authenticator as a final step before redirection. Of course, the next time the user accesses a page and needs to be authenticated, the first servlet will note that a password is already present in the new datastore and automatically forward them to the new authenticator using the new datastore for authentication.

Following this method, even though the old authenticator will not be protecting anything, it will still need to have the infrastructure in place until all users have had their password updated. A separate process may be used to review user accounts in the new datastore to note which ones have been updated (to include a password) and which ones have not. An alternative approach would be to leave the system in place for a set period of time (3 months or 6 months or 1 year for example) and then expire any passwords not used in that time period. These users would then have to re-register, but this is not an uncommon practice for occasional users who are away for an extended period. The high-frequency users would thus have the more transparent system, but a definite end to the transition could be defined (and the ability to turn off the old authenticator) at a much smaller cost of inconvenience to less frequent users.

While in the most preferred embodiment the transition would be mostly transparent, there would be a small amount of additional effort for the users. In the most preferred embodiment. the users will need to go through a user ID screen, a login to the first authenticator (although only the first time they use the system after the transition), and then a login to the second authenticator.

Figure 3:
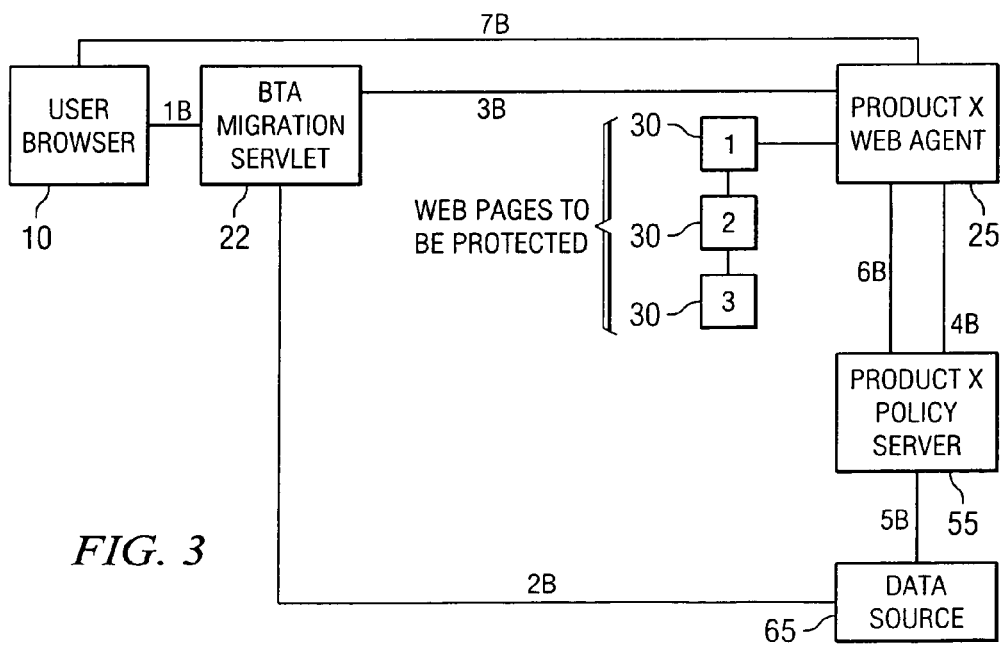
FIG. 3 is a structural diagram of the authentication and authorization process after migration of the requested ID.
Figure 2:
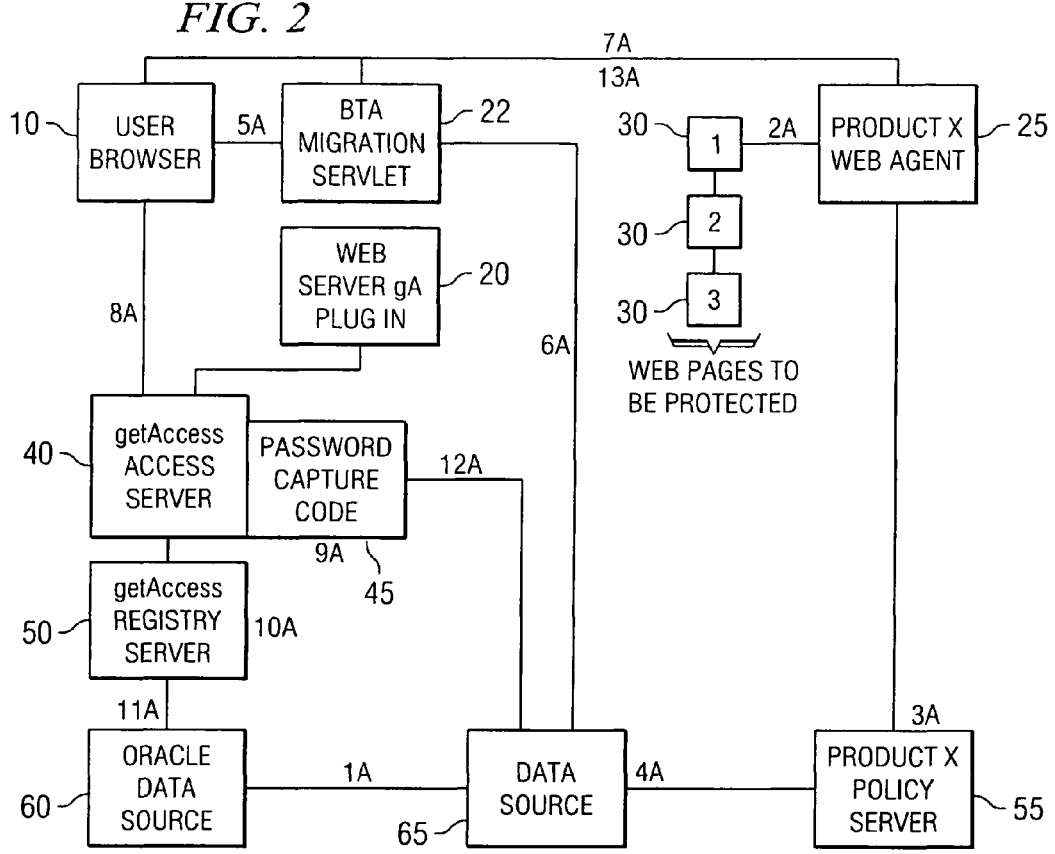
FIG. 2 is a structural diagram of the migration process for authentication and authorization.

To better illustrate one embodiment of the process involving an authenticator protecting a set of secure web pages, examples are provided through FIGS. 1-3 of the original authentication process, of the authentication process during transition, and of the authentication process for a given user on their second cycle through after the transition has started.

FIG. 1 is a structural diagram of a process of authentication and authorization under the first (old) authenticator. In action 1, the user from his browser 10 attempts to access the protected resources 30 (in this example secure access web pages). The web server hosting the resources has a plug-in 20 for the first authenticator which intercepts the request for access and provides a login page to browser 10 seeking authentication information (typically identification and a password) from the user. On completion of the login page, browser 10 submits its response which is directed in action 2 to the first authenticator's access server 40. Access server 40, in action 3, communicates the login information with the first authenticator's registry server 50 which, in action 4, compares the information against the information in the first authenticator's authentication information datastore 60. If the authentication information is verified, then in action 5 registry server 50 provides authentication and typically a set of authorizations for the authenticated user back to access server 40. In action 6 access server 40 confirms the login to the user (typically also providing proof of authentication and possible a set of authorizations, sometimes through use of a cookie) and then in action 7 redirects browser 10 back to the original web-server providing access to the protected resources 30.

In an example of operation of the most preferred embodiment, the migration is broken into two stages which are collectively illustrated in FIG. 2. The first stage occurs before active use of the new authenticator begins.

Pre-Use Tasks:

In action 1A, the non-encrypted data is migrated from the first authenticator's datastore 60 (in this example an RDBMS) to the second authenticator's datastore 65 (in this example an LDAP-compliant directory service). This will include the roles, resources, and user information (except password). The passwords can not be migrated in this fashion, since they are stored in a proprietary encryption algorithm. During this migration the roles and resources can also be translated to comply with new naming standards or with appropriate syntax for the second authenticator. In action 2A, the second authenticator is installed, and the protected resources 30 moved to a web server working in cooperation with the new authenticator (specifically with its web agent (or plug-in) 25). The first authenticator is taken out of any active role in protecting any web resources and the second authenticator is configured to perform this function.

In action 3A, the second authenticator, and more specifically its policy server 55, is configured to use the new resource and role definitions migrated out of the first authenticator's datastore. In action 4A, the second authenticator, and more specifically its policy server 55, is configured to use the datastore 65 to which the data was migrated in action 1A. In part this action involves installing an API for the second authenticator preferably on the policy server 55, but alternatively on the server acting as gateway to the datastore 65. This API helps insure that new entries into the datastore are populated in a format accessible to the second authenticator.

After installation and set-up are complete, the second stage of the migration occurs during active usage of the second authenticator by the users.

Post-Implementation Tasks (Usage Tasks):

When browser 10 tries to establish a session with a protected web resource 30, in action 5A, a servlet 22 (also referred to as an interceptor) will intercept the request and prompt the user for identification (also referred to as identifying information, in this instance for a user ID). In action 6A, the servlet 22 will take the identification and query the new datastore 65 to check to see if the new user profile has been setup and if the password field has been populated with a password to be used by the new authenticator.

If the user has been setup in the new datastore 65 with both an identification and a password, then in action 7A, the browser will be forwarded to the web agent 25 which provides a login page for the second authenticator seeking a password or other authentication information to confirm the proffered identification. In a preferred embodiment, servlet 22 may pre-populate the login page with the identification already provided by the user, leaving only the entry of the user's password for the user to complete. At this point the bind between browser 10 and servlet 22 is broken.

If the query of the new datastore 65 indicates that the user does not have a password in the new datastore 65 (which in this case would mean that the user has not used the system since the migration), then in action 8A, the user will be forwarded to the access server 40 to receive the login page from the old authenticator. In the preferred embodiment, at this point the bind between servlet 22 and browser 10 is broken. In action 9A, as the user enters their password within the access server's login page, a password capture process 45 (referred to in the vernacular as a sniffer) piggy-backed onto the access server 40 will capture (or sniff) the raw password. The password capture process could be a second servlet or could be a code snippet attached to the login process of access server 40.

In action 10A, access server 40 sends the user credentials (also referred to as authentication information, in this instance user ID and password) to registry server 50 for validation. In action 11A, registry server 50 will validate the identification and password against the datastore 60 and return an authentication successful reply back to access server 40.

While the password capture process could simply take the submitted password and store it in the new datastore 65, in the most preferred embodiment, the password capture process will not act until it observes that the user's authentication was successful (providing desirable security about the authenticity of the user and the password). In action 12A, when the authentication successful message is received by access server 40, the password capture process 45 code notes the successful authentication to recognize that it captured a valid password for the user and will then populate the new datastore 65 with the new password associated with that user. In its preferred embodiment, the password capture process 45 uses an API for the second authenticator (stored on the policy server 55 or on the server acting as a gateway to the datastore 65 itself) as its tool for populating the new datastore 65.

Finally, in action 13A, the browser is forwarded to the web agent 25 to receive the second authenticator's login page to be re-challenged. When re-challenged, the user may enter both the user identifier and the password or the user identifier may be pre-populated requiring the user to only enter the password again. Through its web agent 25, policy server 55, and datastore 65, the second authenticator authenticates the identification and password (the password only just populated from the login) and then provides access to the protected pages 30.

FIG. 3 illustrates the process for a user who has already successfully completed migration. The user through browser 10 seeks access to one of the protected resources 30 and is intercepted in action 1B by servlet 22. Servlet 22 seeks and obtains identification from the user and in action 2B queries datastore 65 to determine if a password has been populated for that identification. Since the user has already migrated, there will be a confirmation that the password is present and the browser will be directed to web agent 25. In action 3B web agent 25 will provide its login page for the user to complete. In a preferred embodiment, servlet 22 will prepopulate the login page with the identification it already possesses to save the user a step. In an alternative embodiment, servlet 22 could seek both identification and password, check identification, and then pass both on (by prepopulating the login screen or by direct submission through a different hook or pathway) to whichever authenticator is to be used for authentication on that go around by the user (which would apply to the description of FIG. 2 as well). In action 4B web agent 25 provides the authentication information (identification and password) to policy server 55 which verifies the information in action 5B from datastore 65. In action 6B, policy server 55 provides confirmation of authentication and typically authorization information as well to web agent 25. Web agent 25, in action 7B, then may provide a cookie to browser 10 and provides access to the requested resource 30.

An additional alternative embodiment may take advantage of a feature of the first authenticator. Access server 40 would typically be set-up to pass confirmation of authentication back to plug-in 20 on the web server which was protecting the resources 30. Once initial migration has occurred, the first authenticator is no longer protecting any resources, so this message or confirmation is no longer necessary (as the plug-in no longer exists). However, since the first authenticator is already programmed to send such a message, the message could be used for alternative purposes without significant additional programming effort. Specifically, the access server 40 could be told to send the message to a particular destination (which it presumes is the destination of the plug-in). At that destination, a process could be set-up to record the identification being confirmed or to count each confirmation. This process could then create a quick reference for either which users have completed the migration process or how many users have completed the migration process. In this manner the progress of this last stage of migration could be monitored more easily, which could also provide the opportunity to either extend the time the first authenticator is kept running or to shorten the time if a sufficient number of users have passed through to the new authenticator.

Computer Systems

Figure 4:
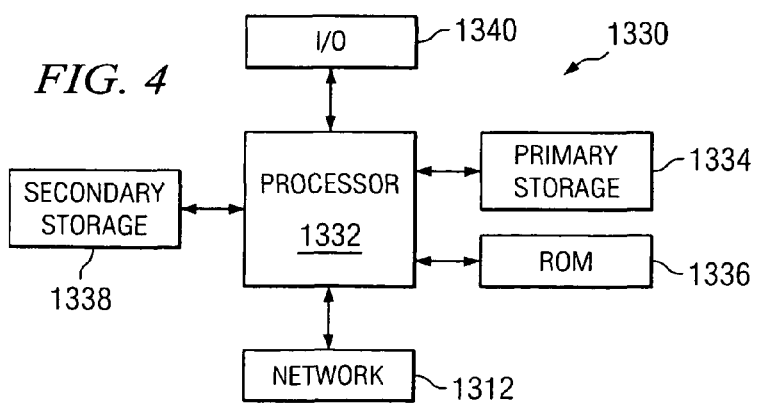
FIG. 4 is a diagram of a typical, general-purpose computer system suitable for implementing the present invention.

An authentication and authorization system as described above may generally be implemented on a variety of different computer systems. FIG. 4 illustrates a typical, general-purpose computer system suitable for implementing the present invention. The computer system 1330 includes a processor 1332 (also referred to as a central processing units, or CPU) that is coupled to memory devices including primary storage devices 1336 (typically a read only memory, or ROM) and primary storage devices 1334 (typically a random access memory, or RAM).

As is well known in the art, ROM acts to transfer data and instructions uni-directionally to CPU 1332, while RAM is used typically to transfer data and instructions in a bi-directional manner. Both storage devices 1334, 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which generally slower than primary storage devices 1334, 1336. Mass memory storage device 1338 may take the form of a magnetic or paper tape reader or some other well-known device. It will be appreciated that the information retained within the mass memory device 1338, may, in appropriate cases, be incorporated in standard fashion as part of RAM 1336 as virtual memory. A specific primary storage device 1334 such as a CD-ROM may also pass data uni-directionally to the CPU 1332.

CPU 1332 are also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above monitor programs and integrated monitoring system may be recognized as sets of computer codes and that such computer codes are typically stored in computer readable mediums such as RAM, ROM, hard discs, floppy discs, or carrier waves and the like.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

The invention claimed is:

1. A method for populating password data to a target datastore associated with a target user authenticator that is in communication with a source user authenticator after migration from the source user authenticator, the source user authenticator having associated with a source datastore comprising unencrypted user identification data and user authentication data encrypted with a proprietary encryption algorithm, while also responding to user requests for information, the method comprising:

migrating unencrypted data from the source datastore to the target datastore;

intercepting, by a servlet interceptor, a request from a user to access information protected by the target user authenticator;

prompting, by the servlet interceptor, the user for an identification;

receiving, by the servlet interceptor, the identification from the user;

locating, by the servlet interceptor, a corresponding identification in the target datastore;

searching, by the servlet interceptor, the target datastore for a user authentication data associated with the corresponding identification;

determining, by the servlet interceptor, that the target datastore does not include a user authentication data associated with the corresponding identification;

forwarding the intercepted request to the source user authenticator responsive to the determining;

prompting, by the source user authenticator, the user for identification and user authentication data;

receiving, by the source user authenticator, identification and user authentication data from the user;

monitoring, by a password capture process, the source user authenticator for an approval response;

detecting, by the password capture process, the approval response from the source user authenticator;

capturing, by the password capture process, the user authentication data provided to the source user authenticator by the user;

populating, by the password capture process, the target datastore with the captured user authentication data associated with the corresponding identification upon detecting the approval response.

2. The method of claim 1, wherein after populating the target datastore, further comprising prompting for and receiving from the user the user authentication data associated with the identification.

3. The method of claim 2, wherein the action of prompting for and receiving from the user the user authentication data associated with the identification comprises prompting for and receiving from the user the identification and the user authentication data associated with the identification.

4. The method of claim 1, wherein migrating unencrypted data from the source datastore to the target datastore comprises:

reading unencrypted data from the source datastore, wherein the unencrypted data represents data for multiple users each having an associated user identification and an associated user authentication data;

converting the unencrypted data to be compatible with the target datastore; and populating the target datastore with the converted data.

5. The method of claim 1 further comprising:

authenticating the received identification using the target user authenticator upon determining that the target datastore includes user authentication data associated with the corresponding identification.

6. The method of claim 5, wherein authenticating the received identification further comprises prompting for and receiving from the user the user authentication data associated with the corresponding identification.

7. The method of claim 1, wherein the target datastore is an LDAP compliant directory service.

8. The method of claim 1, wherein the target datastore is a relational database.

9. The method of claim 1, wherein the source datastore is a relational database.

10. The method of claim 1, wherein the user is a person.

11. The method of claim 1, wherein the user is a software object.

12. The method of claim 1, wherein the user authentication data is a password.

13. The method of claim 1, wherein receiving user authentication form a user further comprises:

prompting for and receiving the identification and the user authentication data from the user after the initial submission of the identification from the user.

* * * * *